(12) United States Patent
Ward et al.

(10) Patent No.: US 9,282,435 B2
(45) Date of Patent: Mar. 8, 2016

(54) LOCATION SPOOFING DETECTION

(71) Applicant: Location Sentry Corp., Camas, WA (US)

(72) Inventors: Matthew L. Ward, Collegeville, PA (US); Craig E. Spiegelberg, Washougal, WA (US)

(73) Assignee: Location Sentry Corp, Camas, WA (US)

( * ) Notice: Subject to any disclaimer, the term of this patent is extended or adjusted under 35 U.S.C. 154(b) by 0 days.

(21) Appl. No.: 14/474,065

(22) Filed: Aug. 29, 2014

(65) Prior Publication Data

US 2015/0065166 A1  Mar. 5, 2015

Related U.S. Application Data

(60) Provisional application No. 61/959,720, filed on Aug. 31, 2013.

(51) Int. Cl.
*H04W 88/02* (2009.01)
*H04W 4/02* (2009.01)
*G01S 5/02* (2010.01)

(52) U.S. Cl.
CPC ............... *H04W 4/023* (2013.01); *G01S 5/02* (2013.01); *G01S 5/0205* (2013.01); *H04W 88/02* (2013.01)

(58) Field of Classification Search
CPC ....... H04W 64/00; H04W 4/02; H04W 4/023; H04W 88/02; H04L 29/08657; G01S 5/0252; G01S 5/02; G01S 5/0205
See application file for complete search history.

(56) References Cited

U.S. PATENT DOCUMENTS

| | | | |
|---|---|---|---|
| 2008/0214205 A1* | 9/2008 | Alles | G01S 5/021 455/456.1 |
| 2010/0222081 A1* | 9/2010 | Ward et al. | 455/456.3 |
| 2011/0295724 A1* | 12/2011 | Hill | G06Q 10/087 705/28 |
| 2013/0203423 A1* | 8/2013 | Alles et al. | 455/446 |

\* cited by examiner

*Primary Examiner* — Ted Wang

(57) ABSTRACT

A spoofed location detection system using information collected from a radio signal or information from multiple receivers collecting multiple radio signals to validate a location estimate.

15 Claims, 2 Drawing Sheets

LOCATION SPOOFING DETECTION

CROSS REFERENCE AND RELATED APPLICATIONS

This application claims priority under 35 USC 119 from U.S. Provisional Application Ser. No. 61/959,720 filed on Aug. 31, 2013, titled LOCATION SPOOFING DETECTION by WARD, Matthew L., the entire disclosure of which is incorporated herein by reference.

FIELD OF THE INVENTION

The invention relates to methods and apparatus for information management associated with a wireless device and, more specifically, but not exclusively, to detection of spoof information regarding location of the wireless device.

BACKGROUND OF THE INVENTION

With the explosive growth in mobile devices, wireless data rates and mobile-based software applications, the security and privacy needs of the user of wireless devices such as smartphones, tablet computers, and wireless LAN-equipped netbooks, laptop portable computers or voice-over-IP phones with nomadic capabilities.

In the rush to establish gain market share, device manufacturers modified existing operating systems (e.g. UNIX, LINUX, Microsoft Windows, POSIX, NeXT, BSD) and added hardware subsystems and sensors (e.g. cameras, accelerometers, GPS receivers, infrared transceivers, Wi-Fi transceivers, Bluetooth transceivers, and digital signal processors) without due consideration to the unique security and privacy situation of a device as private and personal as a wireless device.

The 'user plane' approach implemented in wireless device allows a mobile device to communicate over wireless data backhaul (e.g. cellular, wireless LAN) with networked landside servers. The user-plane approach favors use of device-based and device-assisted location techniques such as use of satellite broadcasts (e.g. Global Positioning System (GPS), Galieo, GLONASS) for precise positioning and infrastructure-based techniques such as cell-id (a proximity location based on the detection of base station, access point beacons, or television broadcast from known transmitters at known transmission sites) or enhanced cell ID (location based on the detection of base station, access point beacons, or television broadcast from known transmitters at known transmission sites with known timing or broadcast power levels allowing for time and/or power-based ranging).

If multiple beacons can be detected, a radio fingerprinting approach, based on the powers of the received signals and either propagation models or uploaded calibration data, can be used for coarse localization.

The cellular base stations are also known as Base Transceiver Sites (BTS), Radio Base Stations (RBS), NodeB's (NB) and eNodeB's (eNB) depending on the radio technology or the manufacturer of the base station(s). The term Access Point (AP) includes wireless local area network (W-LAN) technologies and protocols such as IEEE 802.11, 802.16 and Bluetooth.

The inventive techniques and concepts described herein apply to operating systems such as, and including; Android, iOS, Windows Mobile, Blackberry, Symbian, PalmOS, Firefox OS and Ubuntu Mobile/Ubuntu for phones. The Android-based model discussed is an exemplary but not exclusive environment in which the present invention may be used.

SUMMARY OF THE INVENTION

Some users of wireless devices will seek to provide false location information to application providers out of security concerns, privacy concerns or sheer malice. The ability to detect a false or 'spoofed' location is therefore desirable not only to preserve the validity of the location data collected, but also to preserve the validity of the collateral information associated with a location.

The analysis and detection of spoofed location data therefore can be useful in triggering service denial or service limiting behaviors by the application, therefore punishing the user. Alternately, the detection event can be used positively, with the application provider offering the user incentives and incitements for providing valid location data such as improved location access security, detailed descriptions of the use of their location data, and/or rewards (monetary or otherwise).

Detection of a spoofed location may also be used to prompt the application to begin requesting non-mobile device based locations from alternative sources.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWING

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Figure 1:
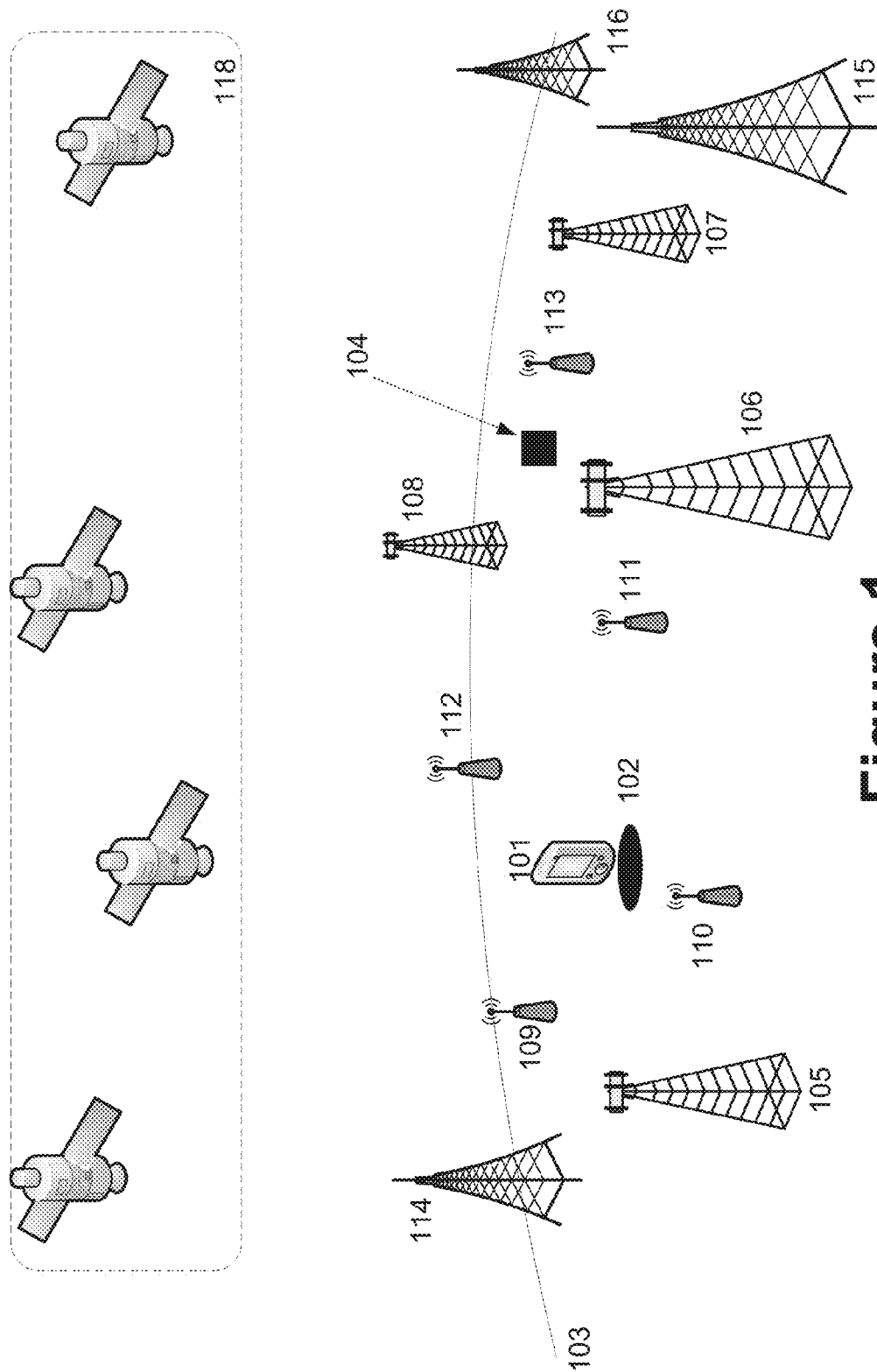
FIG. 1 schematically depicts an example radio environment for a wireless device in accordance with the various aspects of the invention.

Illustrative embodiments of the present invention are described herein in accordance with the various aspects of the invention. First, we provide a detailed overview of the problem and then a more detailed description of our solutions.

Wireless devices have changed in both operation and form-factors, converging the personal computer (PC) with the cellular phone and other communications devices. Besides communications functions (e.g. Voice Telephony, Short-message-service (SMS), Multi-media Messaging Service (MMS), TCP/IP data connectivity) and upgraded general processing power, sensors have been added to the wireless device. For instance, a wireless device (e.g. a smartphone, feature phone, netbook, Personal Digital assistant (PDA), tablet computer or PC with wireless LAN capability) can have:
  Camera/Video functions
  Location data (Satellite-based)
  Location data (Mobile-based)
  Location data (Network-based)
  Motion data (compass, accelerometer, gravitational sensor)

Capacitive Sensors

Address Book, Contacts lists, recent called/emailed data.

Application specific sensing, reading and monitoring capabilities

The wireless device can also have multiple networking capabilities including nomadic wired tethering, local-area-network transceivers (e.g. IEEE802 Wi-Fi), wide-area-network transceivers (IEEE 802.16 WiMAN/WiMAX, cellular data transceivers, (e.g. LTE) and short-range, data-only wireless protocols such as Ultra-wide-band (UWB), Bluetooth, RFID, Near-field-communications (NFC), etc.

Many, if not all, downloadable applications ("apps") loaded on the wireless device ask for access privileges far in excess of any rational use. For example, one popular mapping and turn-by-turn navigation app requires the user to grant permissions for continual access to the following data that is largely created above the kernel and device driver level. A summary of these permissions can be seen in Table 1.

TABLE 1 access call history
read/write phone contacts list
read/write external storage/sdcard
access near-field communications facilities
manage/use account credentials
install shortcut (can place a link on your home screen)
disable keyguard
record audio
access network state (i.e. verify that you have an internet connection)
read-only permission to instant messaging facilities
access & change WI-FI state
access fine location information
access coarse location information
read phone state (i.e. see that you're on the phone or not)
access wake lock
make phone vibrate
monitor internet access/connectivity
knows if phone has completed booting (device state/status)
place a phone call The free-for-all approach to requiring access to wireless device generated data has led many users to turn off the device's location capability entirely. Other users have opted for use of a static mock or test location in attempt to prevent application failures, due to denied locations, at the price of rendering location-based applications nearly useless. More sophisticated location privacy software may spoof a user's location and modify or replace the collateral information to approximate that of the spoofed location.

A. Wireless Device Location

FIG. 1 depicts the spoofing of location for a wireless device. Location of the mobile device using mobile-based techniques requires the reception of beacons. Beacons are useful in that they transmit their locally unique identification. In the service area 103 with at least one wireless network or four or more active satellites available, the wireless device 101 may compute its own location 102 from radio signals received at the device. The wireless device 101 using either device-based or device-assisted location techniques (e.g. using received signal characteristics and received data about the signals and the location of the transmitters of the signals). In this example a navigational satellite constellation 118 supplies broadcast signals that allows the wireless device 101 to self-locate to its actual location 102. Terrestrial radio signal beacons transmitted from nearby cellular base stations 105 106 108 are also received by the device 101 and can be used to compute a coarse location of the device 101 at the actual location 102 if the base station's 105 106 108 geographic locations and beacon transmission powers are known. In this example, WLAN access points (AP) 109 110 111 112 are also transmitting beacon signals received by the wireless device 101 at the actual geographic location 102.

Digitial Television (DTV) stations 114 115 116 are also broadcasting over the service area 103. The DTV signals can be used to compute a coarse location of the device 101 at the actual location 102 if the DTV station's 114 115 116 geographic locations are known. Additional accuracy may be possible if the beacon transmission powers are known.

The wireless device user has decided to spoof the wireless device location and the reportable location is shifted to a spoofed location 104. Dependent on the level of sophistication in the spoofing attempt, not only is the reported location shifted to the spoofed location 104, but the collateral information such as the signal characteristics of the received cellular network beacons transmitted by the base stations 105 106 108 may be modified or deleted. The short-range WLAN beacons 109 110 111 112 would also be subject to modification or deletion.

Dependent on the sophistication of the spoofing, beacons terrestrial base stations (s) 107 and/or AP(s) 113 associated with the spoofed location 104 may be added to the location report.

B. Detection of a Spoofed Location—Single GNSS Location

In the simplest scenario, the location received for analysis consists of a latitude and a longitude. However, detailed information about the signal characteristics may be available for analysis. For instance, a Satellite Navigation System (e.g. the Global Positioning Satellite receiver) may report location and location-related information in the format standardized in the NMEA 0183 specification.

Since many GPS receiver manufacturers use input and output communication as defined by the National Marine Electronics Association (NMEA) 0183 specification, a manufacturer's customization of the NMEA 0183 standard, or an equivalent communications protocol, the NMEA 0183 standard can be used as an example of the types of location-related data that may be used to detect a spoofed location.

Table 2 shows fields of interest in the NMEA defined GPS output.

TABLE 2

Timestamp (in Coordinated Universal Time)
Latitude
Longitude
GPS quality indicator (0 = invalid; 1 = GPS fix; 2 = Diff. GPS fix)
Number of satellites in use [not those in view]
Number of satellites in view
Satellite Elevation and Azimuth Data
Horizontal dilution of position (HDOP)
Altitude
Vertical dilution of position (VDOP)
Heading
Speed
Checksum While each wire device operating system (e.g. Android, Apple iOS) may only provide a subset of the NMEA defined GPS outputs to location requesting applications, analysis of the provided fields may be useful in detecting a spoofed location.

For instance, using either data from land stations or from predictive modeling, satellite data and satellite signal data can be known. In one example, the ID and number of active satellites, the IDs of satellites in view, and each satellite's expected Azimuth and Elevation can be observed or predicted at or near the reported location of the wireless device. If the observed or predicted data does not match the data accompanying the location estimate, then an invalid location may be declared.

C. Detection of a Spoofed Location—Collateral Sensor Information

When a location is delivered to an application by whatever source, location-related information may be generated by other on-board receivers.

Received Cellular beacons, coupled with knowledge of the transmitter geographic location can be used for mobile-based coarse location estimation. Additional accuracy may be possible if the beacon transmission powers are known.

Received W-LAN (e.g. WiFi, Bluetooth) beacons, with knowledge of the AP geographic locations can be used for mobile-based coarse location estimation. Additional accuracy may be possible if the beacon transmission powers are known.

Received DTV broadcasts, coupled with knowledge of the transmitter location can be used for mobile-based coarse location estimation. Additional accuracy may be possible if the beacon transmission powers are known.

Using multiple receivers for location allows the wireless device to self-check the validity of computed locations. By comparing the locations generated by each receiver, spoofed or invalid location estimates can be detected on-board the wireless device.

In one example, the satellite receiver (e.g. GPS) generates a location while at the same time, the local WiFi beacons are noted. Using a database of known WiFi beacon receiver geographic locations, a coarse location may be generated and compared to the satellite broadcast produced location. A mismatch in locations (larger than the error margin of the worst performing location measurement) is indicative of a spoofed location.

D. Detection of a Spoofed Location—Histograms

Once multiple locations have been accumulated a analysis based on the differences between consecutive reported locations becomes possible.

In a first case, a first and second consecutive reported locations are examined and the distance and time between the samples allow computation of speed. This computed speed and the locations themselves can be compared against the speed, heading and altitude information to determine if the second location is possible.

Comparison of satellite information and collateral information if available for the prior and subsequent locations can be analyzed. If the location changes and the received radio information does not, an invalid location can be suspected.

E. System for Location Spoofing Detection

Figure 2:
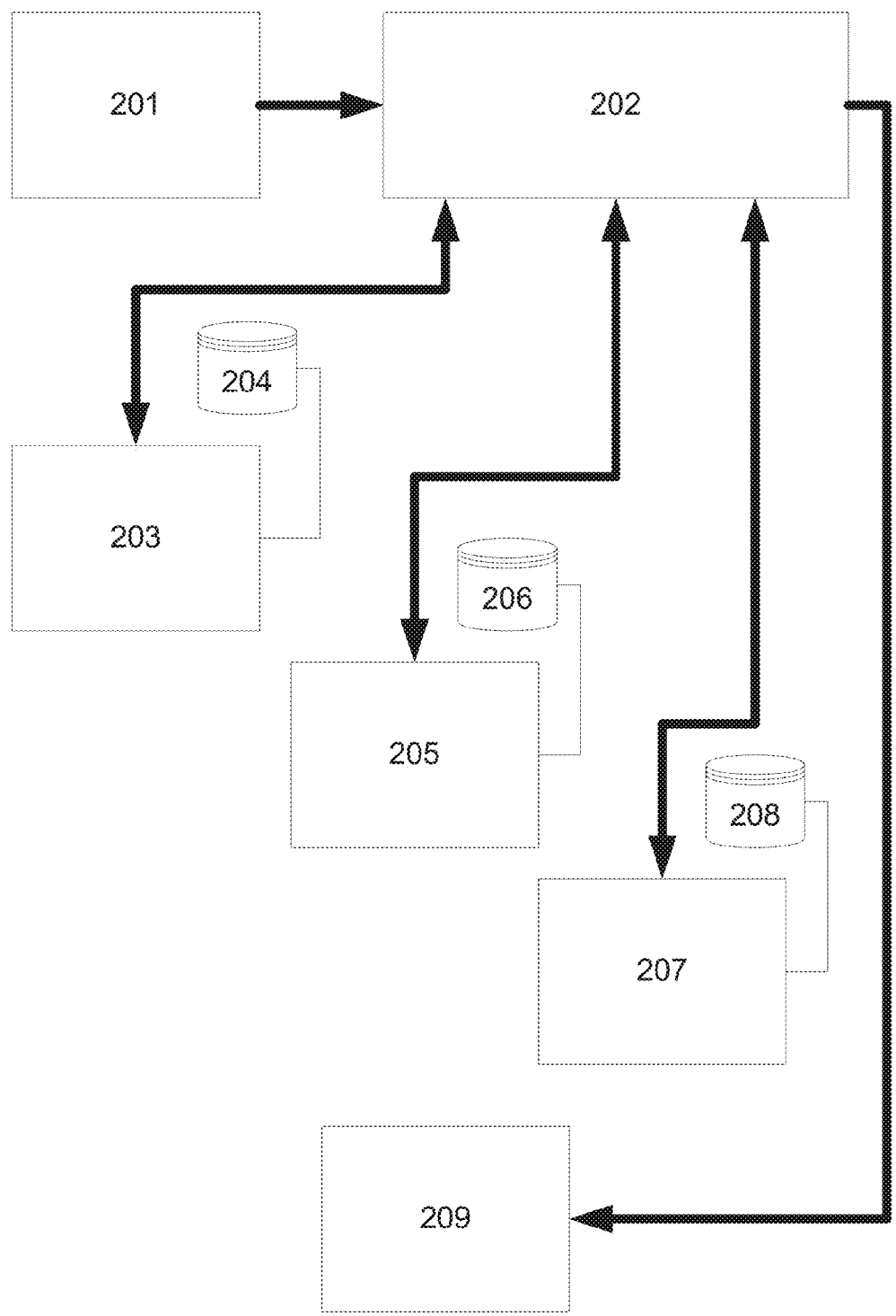
FIG. 2 shows an exemplary method for determining the validity of a location estimate in accordance with the various aspects of the invention.

The system illustrated in FIG. 2 can be implemented on the wireless device or at a land-based server. The tests 203 205 207 may be performed in any order or in parallel based on the analyst's desire and/or server load capacity.

The location estimate, associated data and collateral information is collected as available 201. The nature of the location estimate and the data is analyzed 202 and a validity test selected. The logic of the analysis and selection of the validity test is variable dependent on the amount of location related information delivered and on the desires and needs of the location requesting application.

A test for validity of a satellite navigation system receiver produced location estimate 203 uses locally observed satellite and satellite signal information continuously collected and temporary stored in a database 204. In cases where locally observed satellite and satellite signal information is not available, predictive models may be used. By comparing the location associated satellite and satellite signal data with the observed or predicted values, a mismatch can be detected. Over a threshold, the mismatch becomes a positive indication of a spoofed location. Otherwise the location is returned to the analyzer 202 for delivery to the location application or further testing.

A test for the validity of a location estimate based on the collateral information collected by the various radio receiver systems on the mobile device 205 uses the collected radio information with databased information on the network topology of the various terrestrial radio networks (e.g. cellular, W-LAN, DTV). By comparing the collected collateral information with the databased information, mismatches can be detected. Over a threshold, the mismatch becomes a positive indication of a spoofed location. Otherwise the location is returned to the analyzer 202 for delivery to the location application or further testing.

A test for the validity of location estimate based on comparison with the prior location estimate 207 uses current location, current collected radio information, and recorded location and recorded radio information. Recovering the prior location record from the database 208, the test compares the location, timestamp, speed and heading to see if the current location is possible. Use of road and traffic data (source not shown) can be used to clarify the speed and distance comparison.

If available, the collected satellite radio information from the prior location can be compared to the current collected satellite radio information. Depending on the time interval and distance traveled, the satellite information may change sharply. However, for a stationary or near stationary wireless device with a short location time interval, large changes in satellite data is indicative of a spoofed location.

If available, the collected terrestrial network(s) radio information from the prior location can be compared to the current collected terrestrial network(s) radio information. Depending on the time interval and distance traveled, the terrestrial network(s) radio information may change sharply. However, for a stationary or near stationary wireless device with a short location time interval, large changes in terrestrial network(s) radio information is indicative of a spoofed location.

Over a threshold, the mismatch in prior and current collected radio information becomes a positive indication of a spoofed location. Otherwise the location is returned to the analyzer 202 for delivery to the location application or further testing.

If the location estimate passes the testing regime set by the analyst, the location estimate is delivered to the location requestor 209.

F. Alternative Embodiments

If a mobile-based or mobile assisted location is invalid or high suspect, then alternative location methods may be used to guarantee a valid location. Systems such as network-based receivers using time-difference-of-arrival (TDOA), Angleof-Arrival (AoA), base station reported cell-ID, base station reported cell-ID with power or time based ranging, and/or power-based RF fingerprinting location technologies do not depend on the untrustworthy wireless device reporting its own location.

Control-plane (that is the overhead messaging between the wireless device and the radio access network (RAN) is also a trustworthy source of location. Techniques such as enhanced Observed Time Difference (EOTD) and Observed Time Difference of Arrival (OTDOA) may be available via the wireless carrier to replace, supplement, or just verify the mobile-developed and reported user-plane location.

Satellite navigation systems using the control plane for messaging are also inherently trustworthy and accessible by the wireless carrier. Assisted Global Positioning Satellite Service (AGNSS) is a good example of a standardized, secure location method.

The Secure User Plane (SUPL) location technique also provides more security than a conventional user-plane approach. These examples and any location technology implemented for emergency services can provide a user's location in a difficult to spoof fashion.

The true scope the present invention is not limited to the presently preferred embodiments disclosed herein and indeed could be applied to any reprogrammable remote sensing or other computing device that creates, saves and transmits information that a user or owner could consider sensitive. For example, the foregoing disclosure of a presently preferred embodiment of the location spoofing detection system uses explanatory terms, such as wireless device, mobile device, GPS, Wi-Fi, cellular and the like, which should not be construed so as to limit the scope of protection of the following claims, or to otherwise imply that the inventive aspects of the location spoofing detection system are limited to the particular methods and apparatus disclosed. Moreover, as will be understood by those skilled in the art, many of the inventive aspects disclosed herein are based on software applications and operating systems running on generic hardware processing platforms. These functional entities are, in essence, programmable data collection, analysis, and storage devices that could take a variety of forms without departing from the inventive concepts disclosed herein. Given the rapidly declining cost and power usage of processors, multi-core processors and other processing hardware, it is easily possible, for example, to combine multiple radio receivers (for instance as a software defined radio) without changing the inventive operation of the location spoofing detection system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

It is noted that, as used in this description, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the present invention. Thus, appearances of the phrases "in one embodiment," "in at least one embodiment," "in an embodiment," "in certain embodiments," and similar language throughout this specification may, but do not necessarily, all refer to the same embodiment.

It will be apparent that various aspects of the present invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the teaching of the present invention and certain embodiments, a program or code may be noted as running on a computing device. A computing device is an article of manufacture. Examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is conFIG.d to execute a computer readable program code (e.g., an algorithm, hardware, firmware, and/or software) to receive data, transmit data, store data, or perform methods. The article of manufacture (e.g., computing device) includes a non-transitory computer readable medium having a series of instructions, such as computer readable program steps encoded therein. In certain embodiments, the non-transitory computer readable medium includes one or more data repositories. The non-transitory computer readable medium includes corresponding computer readable program code and may include one or more data repositories. Processors access the computer readable program code encoded on the corresponding non-transitory computer readable mediums and execute one or more corresponding instructions.

Other hardware and software components and structures are also contemplated. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An apparatus comprising at least one processor and at least one memory operably connected to the at least one processor, wherein the at least one memory includes instructions that, when executed by the at least one processor, causes the apparatus to:
   receive location information and collateral information from a device;
   analyze the collateral information to derive geographical information associated with a transmission location of the device; and
   compare the location information with the geographical information to determine if the location information is valid,
   wherein the collateral information is range information and wherein the range information includes power level information associated with at least one of a radio signal from a transmitter and a cellular signal from a base station, each at a nearby transmission location of the device.

2. The apparatus of claim 1 wherein the transmission location is actual location.

3. The apparatus of claim 1 wherein the transmission location is geographical location.

4. An apparatus comprising at least one processor and at least one memory operably connected to the at least one processor, wherein the at least one memory includes instructions that, when executed by the at least one processor, causes the apparatus to:
   receive location information and collateral information from a device;
   analyze the collateral information to derive geographical information associated with a transmission location of the device;
   compare the location information with the geographical information to determine if the location information is valid;
   receive, from the device, a second location information at a second time after a first time of the location information;
   analyze the second location information to calculate a distance between the second location information and the location information; and
   determine if the location information is spoofed information based on a lapsed time, which is calculated using the first time and the second time, compared to the distance change over the lapsed time.

5. The apparatus of claim 4 wherein the transmission location is actual location.

6. The apparatus of claim 4 wherein the transmission location is geographical location.

7. An apparatus comprising at least one processor and at least one memory operably connected to the at least one processor, wherein the at least one memory includes instructions that, when executed by the at least one processor, causes the apparatus to:
   receive location information and collateral information from a device;
   analyze the collateral information to derive geographical information associated with a transmission location of the device;
   compare the location information with the geographical information to determine if the location information is valid; and
   request additional information from the device to at least update the location information.

8. The apparatus of claim 7, wherein the collateral information is a cellular beacon associated with the transmission location of the device.

9. The apparatus of claim 7, wherein the collateral information is satellite signal information.

10. The apparatus of claim 7, wherein the collateral information is range information.

11. The apparatus of claim 10, wherein the range information is radio signal timing.

12. The apparatus of claim 7, wherein the geographical data includes at least one of terrestrial topology, geographical location, and address information.

13. The apparatus of claim 7 including further instructions that cause the apparatus to:
   receive a second location information from the device, wherein at least one of the location information and the second location information are associated, at least in part, with a satellite signal information;
   analyze the satellite signal information to determine geographical data for the satellite signal information;
   compare the location information with the geographical data to determine a mismatch value; and
   determine if the mismatch value exceeds a threshold value, which indicates that at least one of the location information or the second location information is spoofed information.

14. The apparatus of claim 7 wherein the transmission location is actual location.

15. The apparatus of claim 7 wherein the transmission location is geographical location.

* * * * *